United States Patent Office 2,706,739
Patented Apr. 19, 1955

2,706,739

KETONIC CHLORIDES

Robert M. Cole, Bryn Athyn, Pa., assignor to Chemical Elaborations, Inc., Philadelphia, Pa., a corporation of Delaware No Drawing. Original application August 15, 1949, Serial No. 110,459. Divided and this application January 28, 1952, Serial No. 268,677

3 Claims. (Cl. 260—593)

This invention relates to a method of chlorinating ketones and to new ketonic chlorides produced by such method. More particularly, the invention relates to a method of chlorinating ketones directly whereby high yields of the chlorinated ketone are obtained.

The successful chlorination of certain ketones is peculiarly difficult to achieve. However, according to the method described more fully hereinbelow, I have succeeded in chlorinating them directly and am enabled to obtain excellent yields of products of great purity in a relatively simple manner.

According to the invention, certain cyclic and straight chain ketones can be chlorinated to produce extremely reactive ketonic chlorides; for example, cyclo pentanone, cyclo pentenone, methyl cyclo pentanone, methyl cyclo pentenone, and acetonyl acetone can be converted to the corresponding ketonic chlorides.

According to the invention, the ketone is chlorinated by passing gaseous chlorine therethrough while maintaining the mass at controlled low temperatures. More specifically, the invention contemplates the introduction of gaseous chlorine into the ketone at an initial temperature within about from five to ten degrees above the melting point of the ketone in question. Even at these temperatures, the ketone begins to darken after a small quantity of chlorine has been absorbed. I have found, however, that if the temperature is then substantially reduced, further coloration is prevented. Furthermore, if the temperature is lowered immediately upon the first signs of darkening, and chlorination continued, the initial color disappears and a colorless product is obtained. The temperature during the second phase of the chlorination, therefore, should be substantially below the melting point of the ketone in question, and may be as low as from about −50° C. to −60° C. The chlorination is continued at this temperature until the theoretical amount of chlorine necessary to produce the desired ketonic chloride has been consumed. That is until one chlorine atom has been substituted for one hydrogen atom of the ketone molecule. In this chlorination one atom of chlorine also combines with the replaced hydrogen atom, thereby forming hydrochloric acid. Thus, one mole of chlorine gas supplies the theoretically required two atoms of chlorine. When the chlorination has been completed, the product is washed in water containing a few pieces of Dry Ice and a quantity of bicarbonate of soda. During the washing step, some of the hydrogen chloride is carried out by the bubbles of $CO_2$ from the Dry Ice, while the remainder is neutralized by the bicarbonate. The chlorination may be carried out in accordance with the method of the following example, describing the chlorination of acetonyl acetone (I) to produce 3-chlor-2,5-hexanedione (II):

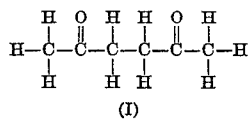

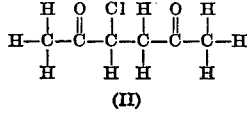

Example 1 mole of acetonyl acetone was placed in a flask and cooled in a bath of Dry Ice and methanol to −20° C. Gaseous chlorine was then passed into the ketone, the rate of delivery of chlorine being kept below the rate at which chlorine combines with the ketone. An excess of chlorine is indicated visually by the assumption of a yellow color by the reacting mass, due to the presence of unreacted chlorine in solution in the ketone.

As soon as a small portion of the chlorine was absorbed, the temperature of the ketone was lowered to −30° C., a temperature below the normal freezing point of unchlorinated acetonyl acetone. At this temperature, the rate of delivery of gas to the mixture was increased, since the presence of the chlorinated acetonyl acetone appears to facilitate the reaction.

When one mole of gas had been consumed, the chlorination was terminated, and the reaction mass poured into 100 cc. of water to which had been added a few pieces of Dry Ice. Three-fourths of a mole of bicarbonate of soda was then added. The oily phase was separated, more Dry Ice was added, and the product was dried with calcium chloride. The yield of chlorinated acetonyl acetone (structure II) was 95% of theory.

Certain of these chlorides, produced in accordance with this invention, and particularly acetonyl acetone chloride, are relatively unstable compounds, due to the extreme activity of the chlorine atom adjacent the carbonyl group. In fact, acetonyl acetone chloride is so unstable as to undergo rapid spontaneous degradation if allowed to stand under ordinary conditions. Therefore, it is preferred to prepare these materials immediately prior to use.

The ketonic chlorides produced in accordance with the foregoing invention are particularly useful raw materials for the synthesis of ketonic esters which exhibit powerful insecticidal characteristics. The ketonic chlorides are also useful reagents in other organic syntheses.

The subject matter claimed herein has been divided from my copending application Serial No. 110,459, filed August 15, 1949, entitled "Ketonic Esters."

I claim:

1. 3-chlor-2,5-hexanedione.

2. The method of chlorinating acetonyl acetone which comprises cooling acetonyl acetone to within 10° C. above its melting point, passing a small quantity of gaseous chlorine through the acetonyl acetone, further cooling the partially chlorinated acetonyl acetone to a temperature substantially below the melting point of unchlorinated acetonyl acetone, and passing chlorine through the partially chlorinated acetonyl acetone until one mole of chlorine has been introduced for each mole of acetonyl acetone.

3. The method of chlorinating acetonyl acetone which comprises cooling acetonyl acetone in a bath of Dry Ice and methanol to a temperature of about −20° C., passing gaseous chlorine into the cooled ketone until a darkening occurs, immediately cooling the partially chlorinated ketone to a temperature substantially below the melting point of the unchlorinated ketone, and continuing to pass chlorine into the ketone until a total of one mole of chlorine has been introduced for each mole of ketone, pouring the reaction mass into water containing Dry Ice and bicarbonate of soda, and separating the washed oily product from the aqueous phase.

References Cited in the file of this patent

UNITED STATES PATENTS

| | | |
|---|---|---|
| 2,107,197 | Butignot | Feb. 1, 1938 |
| 2,209,683 | Boese | July 30, 1940 |
| 2,569,132 | Melstrom | Sept. 25, 1951 |

OTHER REFERENCES

Bell et al.: Proceedings Royal Soc. (London), vol. A176, pp. 88–113 (95–98 pertinent) (1940). Abstracted in Chem. Abstracts, vol. 34, page 77064.